July 9, 1946.　　　　　L. W. BLAU　　　　　2,403,704
THERMAL PROSPECTING
Filed March 27, 1942

INVENTOR.
Ludwig W. Blau
BY
J. S. McKean
ATTORNEY.

Patented July 9, 1946

2,403,704

UNITED STATES PATENT OFFICE 2,403,704

THERMAL PROSPECTING

Ludwig W. Blau, Houston, Tex., assignor to Standard Oil Development Company, a corporation of Delaware Application March 27, 1942, Serial No. 436,400

4 Claims. (Cl. 73—432)

The present invention is directed to a method for prospecting for oil by determination of subsurface thermal anomalies.

In a paper published in vol. 135, #8, of Engineering and Mining Journal, at pages 342, et seq., J. N. A. van den Bouwhuijsen described a thermal prospecting method according to which he measured temperatures at uniform depths over an area to be surveyed. The author indicated that the temperature measurements were preferably made at depths of about 1.5 meters in holes of small diameter. He cautioned against taking an immediate reading, and advised allowing about two hours after drilling of the hole before making a reading. He commented that deeper holes, say about 25 meters, would not be desirable because of the increased cost of drilling, the occurrence of great and undesirable changes in local conditions because of the necessary larger diameter of the holes, and the increase in the effect of the temperature of the air on the reading at the bottom of the hole, also resulting from the larger diameter. According to the author, the temperature measurements are made by drilling a hole and suspending in the hole one junction of a thermocouple. It is clear from his description that his measurements were made in open holes. It is for this reason that he mentioned, as a drawback of deep holes, the increased effect of the temperature of the air on the reading at the bottom of the hole by virtue of the greater diameter of the hole.

It has now been found that in order to obtain reliable information in conducting thermal surveys, whether by the use of shallow holes or by the use of deep holes, it is necessary to simulate as nearly as possible the conditions which obtained before the hole was drilled. To this end it is the practice, according to the present invention, to fill the hole as nearly as possible with dirt after the thermometers have been placed in them. With deep holes it is always necessary to leave the thermometers in place, since, once the holes have been filled with dirt, it is impossible to pull the thermometers out.

Furthermore, in conducting a thermal survey it has been found necessary to allow considerable time for equilibrium to be reached before attributing any significance to a temperature reading. It is, for example, absolutely useless to make a reading a few hours after a hole has been drilled when the hole has a depth of 25 feet or greater. With holes of a depth of 100 feet, for example, equilibrium is not attained until about a week or more after the hole has been completed. Generally, with holes of such depth, readings made less than three days after completion of the hole are meaningless. What is usually done is to make readings at intervals of any desired duration, such as daily or weekly, until two successive readings are about the same. It can then be decided that equilibrium has been reached.

In the practice of the present invention, it is preferred to use holes of a depth such that the temperature recorded is substantially independent of surface conditions. The exact depth at which these conditions are no longer felt will change from area to area, but it is safe to say that in most areas a depth of 25 feet is sufficient to eliminate most of the surface effects, although depths of 50 feet or more, such as a 100 or 200 feet, are to be preferred. Depths as shallow as 12 feet, however, may be utilized.

The most suitable thermometer for the practice of the present invention is the conventional resistance coil thermometer. It will, of course, be understood that the resistance coil must be carefully water-proofed. There is no limit on how well the resistance coil can be insulated, since as pointed out above, the thermometer is left in place for such a long time before being read that any lag introduced by virtue of insulation has no effect. In view of the fact that, for much of this prospecting, the thermometer is abandoned after use in a single hole, it is advisable to construct the thermometer as cheaply as possible consistent with reliability. A suitable thermometer is a well insulated resistance coil, weighted to insure that it will go to the bottom of the hole, and connected to a two conductor cable of sufficient length to reach to the surface, so that after the hole is filled with earth and well tamped, the conductors protruding at the surface can be connected to a bridge circuit or any other suitable circuit for measuring the resistance of the buried coil.

In a practical operation according to the present invention, holes are dug to the desired depth at spaced points over an area to be investigated. These holes will ordinarily be dug along intersecting lines and form a pattern which will permit the drawing of sufficient iso-thermal lines to give the desired picture of the area. When 100 foot holes are employed, adequate information can be secured by placing the holes about a half-mile apart.

Seasonal temperature effects penetrate to varying depths in different areas. In the Gulf Coast, the temperature is found to decrease from a depth of a few feet below the surface to a depth of about 60 to 70 feet and then to increase with depth. Thus it is important when deep holes of say 100 feet are used to drill the holes to the desired depth and not deeper, for example to 125 feet, with the intention to suspend the thermometer at 100 feet and then filling the hole below and above the thermometer. When this is done the hole may bridge immediately below the thermometer, thus leaving an open hole or a hole filled with air or water, as the case may be, below the bridge. Convection currents in the air or water will then conduct heat from the bottom of the hole, which will be at a higher temperature, to the bridge-over and thence to the thermometer, thus giving a spurious reading for the location. Conversely, when shallow holes of say less than 60 feet in depth are employed, the temperature at the bottom of a hole drilled too deep will be lower, thus causing a spurious low temperature reading for the location. These illustrative examples, taken from experience, further demonstrate the necessity of restoring, as nearly as possible, the conditions which obtained before the hole was drilled.

Ordinarily, each hole is dug with a rotary bit and the simultaneous use of drilling mud for the removal of cuttings. When the desired depth is reached, the drill bit is withdrawn and the weighted resistance coil is lowered into the hole. The operator then dumps as much earth as possible into the hole and tamps the fresh earth until it is level with the surface and is firm. Of course, during dumping and tamping the operator holds the conductors so that they will protrude above the surface. Then, at the desired intervals, the operator connects these conductors into a resistance measuring circuit.

It is important to supply a weight for the thermometer. In some cases the holes have a tendency to bridge and if the thermometer is weighted it is sometimes possible to spud it through the bridgeover, to insure that it will reach the depth intended.

In practice, when using 100 foot holes it has been found that, after the second or third reading at weekly intervals, equilibrium is reached, and the readings made upon the attainment of equilibrium are recorded for the preparation of the map.

As in all prospecting methods, the map is ordinarily made by marking the locations of the holes on a map of the area and putting down adjacent each hole the temperature recorded in it. Then lines are drawn through equal recorded values to produce isothermal contours. It will usually be found that the isotherm indicating the highest recorded temperature will define an area over a buried structure, such as a salt dome or anticline, which is capable of providing a reservoir for oil.

Figure 1:
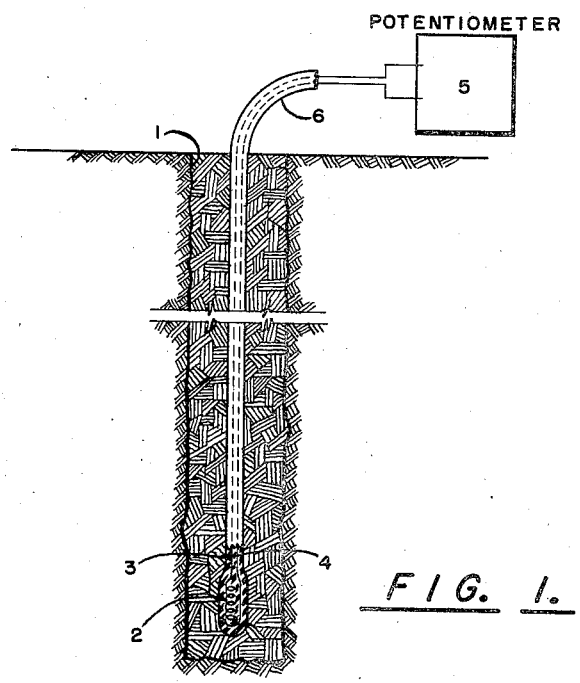
Fig. 1 shows apparatus for use in performing the method.
Figure 2:
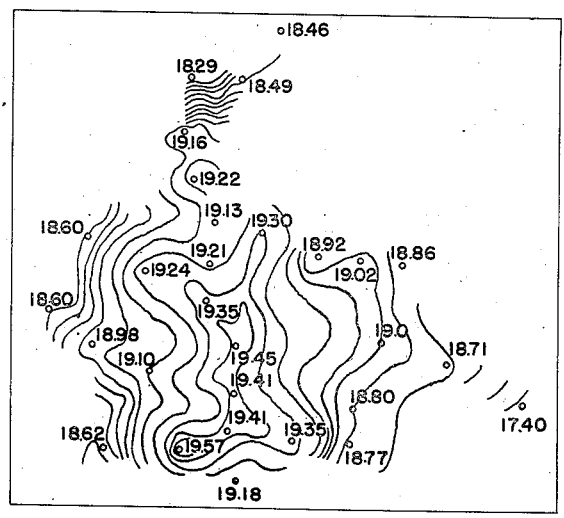
Fig. 2 shows a map.

A tracing of a map obtained in thermal prospecting with the method and apparatus disclosed in the present application is shown in Fig. 2. The circles indicate the locations of the holes in which thermometers were placed as shown in Fig. 1. The numbers ranging from 17.40 to 19.57 are the temperatures in degrees centigrade which were obtained in the holes. The lines are isothermal contours. Inspection of the map discloses that the temperature increased roughly toward the central part of the area although the highest temperature was read near the bottom of the map. The Hawkins oil field in Wood County, Texas, was discovered in this area and the highest part of the geological structure lies near the central part of the map shown in Fig. 2, where the highest temperatures were obtained.

A preferred embodiment of the invention is illustrated in Fig. 1 in which numeral 1 designates a hole with a coil of wire 2 connected by means of two conductors 3 and 4 to a potentiometer 5. The coil and the conductors are insulated from the surroundings by means of the insulating layer 6 which is ordinarily rubber. The hole 1 is filled with earth so as to prevent the establishment of convection currents and to simulate as nearly as possible the conditions which obtained, at the point where the coil is located, before the hole was drilled.

The nature and objects of the present invention having been thus described and illustrated, what is claimed as new and useful and is desired to be secured by Letters Patent is:

1. A method for prospecting for oil which comprises drilling boreholes at spaced points over an area to be surveyed, suspending a thermometer in each borehole at a selected depth, the depths being substantially the same for all boreholes and being at least sufficiently great to exclude the effect of surface conditions, pouring earth into the hole above the thermometer so as to reproduce as nearly as possible the conditions obtaining before the hole was drilled, allowing the thermometer to remain in place until successive readings thereof, at suitable time intervals, are substantially the same, thereby indicating that thermal equilibrium has been reached, and recording the reading of the thermometer after equilibrium has been attained for the purpose of correlating it with similar readings made in other holes to determine the contours of isotherms.

2. A method for prospecting for oil which comprises drilling boreholes at spaced points over an area to be surveyed, suspending in each borehole at a selected depth sufficiently great to exclude the effect of surface conditions a resistance coil thermometer at the end of a conductor cable, pouring earth into the hole above the thermometer so as to reproduce as nearly as possible the conditions obtaining before the hole was drilled, while arranging said conductor at the top of the hole for connection to an electrical circuit, periodically connecting said thermometers to an electrical measuring circuit until successive measurements, at suitable time intervals, indicate that the resistance coil has attained a fixed temperature, and recording the measurements made of this fixed temperature for the purpose of correlating temperatures with sample locations.

3. A method according to claim 1 in which each borehole is of the order of one hundred feet, and a period of at least a week is allowed for the thermometer to reach equilibrium.

4. A method according to claim 2 in which each borehole is of the order of one hundred feet, and a period of at least a week is allowed for the thermometer to reach equilibrium.

LUDWIG W. BLAU.